United States Patent [19]  [11] 3,983,062
Baldwin et al. [45] Sept. 28, 1976

[54] LATEX FROM CONJUGATED DIENE BUTYL RUBBER

[75] Inventors: Francis P. Baldwin, Summit, N.J.; Alberto Malatesta, Brussels, Belgium; Charles P. O'Farrell, Clark, N.J.

[73] Assignee: Exxon Research and Engineering Company, Linden, N.J.

[22] Filed: Aug. 9, 1974

[21] Appl. No.: 496,199

[52] U.S. Cl. ............ 260/29.7 H; 260/29.7 B; 260/29.7 AT; 260/29.7 EM
[51] Int. Cl.² ............................ C08L 47/00
[58] Field of Search ........ 260/29.7 H, 29.7 B, 260/29.7 AT, 29.7 EM

[56] References Cited
UNITED STATES PATENTS

| | | | |
|---|---|---|---|
| 2,751,365 | 6/1956 | Scott | 260/29.7 AT |
| 2,871,137 | 1/1959 | Aldridge et al. | 260/29.7 B |
| 2,933,468 | 4/1960 | Aldridge et al. | 260/29.7 AT |
| 3,414,432 | 12/1968 | Mertzweiller et al. | 260/29.7 H |
| 3,428,589 | 2/1969 | Coats | 260/29.7 H |
| 3,775,387 | 11/1973 | Baldwin | 260/79.5 B |
| 3,816,371 | 6/1974 | Baldwin et al. | 260/85.3 R |
| 3,886,110 | 5/1975 | Go et al. | 260/29.7 H |

FOREIGN PATENTS OR APPLICATIONS
800,161  8/1958  United Kingdom ............ 260/29.7 B Primary Examiner—Eugene C. Rzucidlo
Attorney, Agent, or Firm—A. Lagani; John J. Mahon

[57] ABSTRACT

A process for preparing latices in ionomeric form from copolymers of an isoolefin containing from 4 to 7 carbon atoms and a conjugated multiolefin containing from 4 to 14 carbon atoms, where a major portion of said conjugated multiolefin has conjugated diene unsaturation, is disclosed. The process principally comprises forming an adduct of conjugated diene butyl rubber with a dienophile capable of implanting carboxylic acid functionality on the polymer such as maleic anhydride, emulsifying the adduct thus formed, and neutralizing the resulting emulsion with a suitable base. Highly improved ionomeric latices are also disclosed, having an average particle size of less than about 1 micron, average solids contents easily adjusted from between about 5 to 70 weight percent solids, and having a pH, depending on the emulsifier used, of from 3 to 12. Films cast from these latices have an improved tensile at break of greater than about 2500 psi.

23 Claims, No Drawings

LATEX FROM CONJUGATED DIENE BUTYL RUBBER

FIELD OF THE INVENTION

The present invention relates to a process for preparing improved latex compositions, and the improved latices thereby produced. More particularly, the present invention relates to a process for preparing latices from various polymers and specifically from conjugated diene butyl rubber. Still more particularly, the present invention relates to a process for preparing latices from adducts of conjugated diene butyl rubber and particular dienophiles, such as maleic anhydride. The present invention also relates to improved latex compositions, and more particularly improved latex films produced thereby.

BACKGROUND OF THE INVENTION

The preparation of a latex from certain polymers, such as butyl rubber and sulfobutyl rubber is known. Thus, aqueous suspensions of such materials have heretofore been prepared, employing various emulsifying agents and stabilizers, and latex products have been prepared from these emulsions for use as adhesives and as bonding agents for various fibers, etc. While such processes are known, the preparation of artificial latices, particularly from polymers containing acidic functionality, and their neutralized counterparts, has been difficult. These particular polymers, and their neutralized analogues, e.g., the sodium salts of sulfobutyl rubbers, are very difficult to emulsify. They require mixed solvent systems to effect solubilization, very specific emulsifiers, and are very susceptible to inversion to water in oil emulsions during finishing.

It is therefore an object of the present invention to provide a novel process for preparing latices of ionomeric polymers containing carboxylate functionality in a simple and uncomplicated manner.

In order better to understand the significance of this invention, however, it is necessary to review first the development of the polymers which form the base for this new latex.

Butyl rubber is produced by the copolymerization of an isoolefin such as isobutene with a conjugated multiolefin such as isoprene or butadiene. While butyl rubber has been a highly successful commercial product, various modified forms of butyl rubber containing greater degrees of unsaturation have been sought. Thus, Ser. No. 228,727, filed on Feb. 23, 1972 in the name of Francis P. Baldwin and Alberto Malatesta, now U.S. Pat. No. 3,816,371, and Ser. No. 228,728, also filed on Feb. 23, 1972 in the name of Francis P. Baldwin, now U.S. Pat. No. 3,775,387, respectively disclose a conjugated diene butyl rubber and a method for preparing same. These applications thus disclose the dehydrohalogenation of halogenated butyl rubber in order to produce a conjugated diene butyl rubber containing conjugated diene unsaturation. The conjugated diene butyl rubber thus produced, as described and claimed in Ser. No. 228,727, which is incorporated herein by reference, is represented by the general formula:

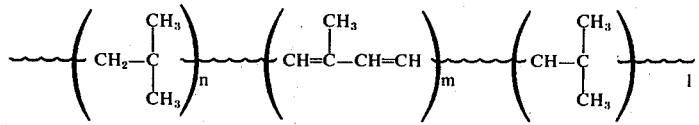

wherein $n + 1$ represents the number of isoolefin units incorporated in the butyl rubber, and m represents the number of initial diolefin units present, though other structures may be present, for example the structure:

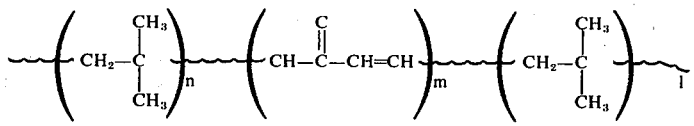

Further, several methods for preparing such conjugated diene butyl rubber are disclosed in Ser. No. 228,727, and these methods are also incorporated herein by reference. Additionally, other conjugated diene structures derivable from generic butyl rubber are disclosed in Ser. No. 465,479, filed on Apr. 30, 1974.

As stated above, it is therefore an object of the present invention to provide an uncomplicated method of preparing latices from such polymers and the resulting modified analogues occurring from the Diels-Alder addition of a dienophilic anhydride. It is another object of this invention to provide improved latices for use, in films, as adhesives, bonding agents, paper coatings, etc.

SUMMARY OF THE INVENTION

It has now been discovered that improved latices can be prepared from polymers containing acidic functionality, such as copolymers of an isoolefin containing from 4 to 7 carbon atoms and a conjugated multiolefin containing from 4 to 14 carbon atoms, wherein a major portion of said conjugated multiolefin has conjugated diene unsaturation, by the steps of forming an adduct of the copolymer and a dienophile capable of implanting carboxylic acid functionality on the polymer, such as a dienophilic anhydride, dissolving the polymer in a suitable solvent to form a cement, emulsifying the cement thus formed with an appropriate amount of water and an emulsifier to an average particle size of from 1 to 10 microns, and neutralizing the raw emulsion thus formed with a suitable base, stripping off the solvent and concentrating the finished latex.

The ionomeric latices which are thus produced are substantially homogeneous, and have an average particle size of from about 0.1 to 3 microns, preferably less than about 1 micron, an average solids content which can be easily adjusted between about 5 and 70 weight percent solids, preferably from about 40 to 70 weight percent solids and most preferably about 60 weight percent solids, and can be neutralized to a pH of from 3 to 12, preferably from 5 to 12, depending upon the particular emulsifier which is utilized. Such latices, when cast, form clear, smooth films which have excellent physical properties, including an improved modulus, improved tensile strengths, and superior elongation properties. These latices are highly useful as binders or coatings for paper, adhesives, particularly as adhesives for non-woven fabrics, prepared from such polymers as polyolefins, including polypropylene, polyethylene, etc.

DETAILED DESCRIPTION

The precursor polymer from which the improved latex compositions of the present invention are prepared preferably comprise a conjugated diene butyl rubber, which itself may be prepared by the dehydrohalogenation of halogenated butyl rubber. Specifically, these processes for preparing conjugated diene butyl rubber comprise contacting a solution of halogenated butyl rubber with: (1) a soluble metal carboxylate, where the metal is selected from the metals of Group IB, IIB, IIA and VIII of the Periodic Table; (2) a soluble carboxylic acid; and (3) an oxide or a hydroxide of a metal selected from Groups IA or IIA or the Periodic Table. Alternatively, the carboxylic acid and the Group IA or IIA metal oxide or hydroxide can be replaced in part by a Group IA or IIA metal carboxylate. Further details of the process for preparing the conjugated diene-containing butyl rubber used in preparing the latex of the present invention may as has been stated be gleaned from Ser. No. 228,728, filed Feb. 23, 1972, incorporated herein by reference.

In the initial step for preparing the present ionomeric latices from such polymers as conjugated diene butyl rubber, a Diels-Alder adduct of the conjugated diene butyl and a particular dienophile is formed. The Diels-Alder reaction for the addition of an ethylenic double bond to a conjugated diene such as 1,3-butadiene or cyclopentadiene, is a well known reaction. The use of various dienophiles in these reactions are also well known, including polyfunctional and monofunctional dienophiles. Typical of such polyfunctional dienophiles are m-phenylene-bis-maleimide, ethylene glycol dimethacrylate, trimethylolpropane trimethacrylate, and typical of such monofunctional dienophiles are cis-2-butenediol, maleic anhydride, maleic and fumaric acid, vinyl trichlorosilane, allyl alcohol, acrylic and methacrylic acid, crotonaldehyde and the like.

In the present process, an adduct is formed between the conjugated diene butyl rubber and an equimolar amount of a dienophile which is capable of implanting carboxylic acid functionality on the polymer, such as a dienophile anhydride, preferably maleic anhydride. Such an adduct is soluble in appropriate hydrocarbon solvents due to the absence of ionic links. No selective polar cosolvent, such as alcohol, is thus required to solubilize the polymer, as is the case with ionomers containing sulfonic acid functionality.

A cement phase is thus prepared from the resultant adduct by dissolving same in a hydrocarbon phase, such as hexane, heptane, benzene and various other such solvents which dissolve butyl, but preferably toluene. Alternately, the adduct can be formed by preparing a cement of the conjugated diene butyl and adding the dienophile thereto, the Diels-Alder reaction adduct being formed spontaneously. The rate of reaction may be accelerated by heating the cement. The concentration of polymer in the cement phase can vary from about 2 to 50 weight percent solids. This cement phase may now be used to prepare an aqueous emulsion of the adduct.

Subsequently, a raw emulsion is formed from the adduct of the conjugated diene butyl rubber. As stated previously, the emulsion is easily formed and is highly stable due to the solubility of the adduct in the hydrocarbon, and the insensitivity of the adduct to possible polar impurities. To form a stable raw emulsion from modified conjugated diene butyl, the cement phase of the polymer is contacted with water containing a suitable dispersing agent. The amount of $H_2O$ employed can vary from about 50 to 200 volume percent of the cement phase, preferably from about 70 to 100 volume percent. The emulsifier used, as the dispersing aid, can be anionic or nonionic. An example of a typical anionic emulsifier useful in the present invention is Alipal CO-433, the sodium salt of a sulfate ester of nonylphenoxypoly(ethyleneoxy)$_4$ ethanol. An example of a typical chemically sensitive type of anionic emulsifier useful in the present invention is Neofat 92-04, a mixture of $C_{12}$–$C_{18}$ fatty acids, the main component of which is 77% oleic acid. An example of a typical nonionic emulsifier useful in the present invention is Triton X100, an ethoxylated octyl phenol comprising about nine moles of ethylene oxide. The amount of emulsifier employed can vary from about 3 to 20 (based on the weight of polymer present), more preferably from about 3 to 10 parts per hundred.

Principally, the purpose of these additives or emulsifiers is to assist in the preparation of a stable raw emulsion, which can be formed because of the above-noted nature of the adducts of this invention. These homogeneous raw emulsions are thus characterized by an average particle size of between about 2 and 10 microns, and preferably less than about 5 microns.

Finally, it is now possible to prepare a stable, homogeneous artificial latex of the ionomeric form of the polymer. This is accomplished by neutralizing the raw emulsion with an appropriate base, either inorganic or organic in nature. Examples of an inorganic base will be ammonium hydroxide an alkali metal hydroxide, and most preferably potassium hydroxide. An example of an appropriate organic base would be ethyl amine. The result of this neutralization is the preparation of a substantially homogeneous raw emulsion in ionomeric form. This ionomeric raw emulsion is then stripped of solvent and excess water to form a finished latex. The finished latex is characterized by an average particle size of from about 0.1 to 3 microns, preferably from about 0.1 to 2 microns, and most preferably less than about 1 micron, an average solids content which can easily be adjusted between about 5 and 70 weight percent solids, preferably from about 40 to 70 weight percent solids, and most preferably to about 60 weight percent solids, without disturbing the homogeneity of the emulsion, and a pH of from about 5 to 12.

The preparation, in such a relatively simple manner, of such a homogeneous, stable latex of the ionomeric polymer from these polymers was totally unexpected. Furthermore, the latex itself has been found to possess certain unexpectedly superior properties as compared to previously prepared latices. The latices of this invention are therefore easily cast into smooth, clear films, which demonstrated improved tensile strength of two orders of magnitude greater than butyl rubber when similarly cast from latex, i.e. 3000 psi vs 30 psi. They have an improved 500% modulus of greater than about 500 psi, and exhibit superior properties as a binder for paper and as an adhesive, particularly for non-woven fabrics, prepared from such polymers as polyolefins, including polypropylene, polyethylene, etc. These properties are believed to principally result from the stable, homogeneous nature of the latices of the ionomeric polymers containing carboxylate functionality produced by the present process.

A more complete understanding of the present invention can be obtained by reference to the following examples:

EXAMPLE 1

A cement was prepared by dissolving 275 grams of conjugated diene butyl rubber (prepared by the process of Ser. No. 228,728, and containing 1.2 mole percent conjugated diene, 0.14 mole percent allyl ester and 0.14 weight percent chlorine) in 1,750 milliliters of toluene in a 2-gallon can, on a reciprocating shaker. When all of the polymer had dissolved, 6.5 grams of maleic anhydride were added and the mixture left on the shaker for 4 days to effect solution of the anhydride and partial reaction with the polymer. The can was then removed, and placed on a steam bath where the contents were nitrogen blanketed, and allowed to react completly by heating overnight (approximately 16 hours). The cement thus prepared was used in the following manners shown in Examples 2 and 3.

EXAMPLE 2

Anionic Emulsion with Non-Ionic Character

Three hundred and thirty-three grams of the cement, namely the conjugated diene butyl rubber adduct dissolved in toluene, containing 50 grams of the polymer, was added to a water phase containing 300 grams of deionized water and 15.5 grams of 31% Alipal, an anionic surfactant, and hand stirred. An emulsion was formed, and the particle size of this crude emulsion was reduced in dispersator for three 3-minute intervals, at 40 volts open, 110 volts open and 110 volts closed. The average particle size of the raw emulsion was then approximately 1 micron. Neutralization of the raw latex was then carried out by adding 1.3 grams of potassium hydroxide (0.024 moles) to a pH of 11.7. The raw latex was then stripped on a Rotovac to remove the toluene and excess water. The finished latex included 47.8 by weight percent solids and was very fluid.

A smooth, clear film formed by casting from the latex followed by drying revealed the following physical properties:

100% modulus, psi = 150
300% modulus, psi = 375
500% modulus, psi = 525
tensile strength, psi = 2800
% elongation = 1000

EXAMPLE 3

Anionic Emulsion

To another 333 g. portion of the cement prepared in Example 1 containing 50 grams of the polymer were added 2.5 grams of Neofat 92-04, an emulsifier. This cement phase was slowly added to a water phase containing 300 grams of deionized water and 5.0 grams of 10 weight percent potassium hydroxide solution, and hand mixed. A homogeneous mixture did not form, and the particle size was reduced on a dispersator for three 3-minute intervals, at 40 volts open, 110 volts open and 110 volts closed, respectively. The solution still did not appear homogeneous, and 13 milliliters of a 10 weight percent solution of potassium hydroxide was then added, followed by reduction of the particle size on the dispersator for 3 minutes at 110 volts closed. The particle size of the raw emulsion was then approximately 1 micron average, and had a pH of 11.9. The raw latex was then stripped on a Rotovac to remove toluene and excess water and the finished latex had 47 weight percent solids and was very fluid.

A sample was then again cast on a glass plate and dried as in Example 2, and demonstrated the following physical properties:

100% modulus, psi = 200
tensile strength = 310
% elongation = 200

EXAMPLE 4

In order to demonstrate that a chemically sensitive form of an ionomeric latex (in coagulable form) has been prepared in Example 2, samples of the latex of the present invention and latex prepared from unmodified butyl rubber and a chemically sensitive emulsifier were compared. Each was coagulated with a 10% solution of calcium nitrate, with the following results in terms of milliliters of $Ca(NO_3)_2$ per 20 grams of polymer to effect coagulation:

| Latex Prepared From Conjugated Diene Butyl | Latex Prepared From Butyl |
|---|---|
| 8.8 | 8.0 |

These data show that both latices are readily coagulable by the addition of small amounts of polyvalent, water-soluble metal salts.

What is claimed is:

1. A process for preparing latex from a copolymer of an isoolefin containing from 4 to 7 carbon atoms and a conjugated multi-olefin containing from 4 to 14 carbon atoms wherein said copolymer has been modified to have incorporated therein conjugated unsaturation, which comprises: (a) forming a cement by dissolving said copolymer in a hydrocarbon solvent; (b) forming an adduct of said copolymer by reacting the copolymer with an equimolar amount of an acid anhydride dienophile, the concentration of the polymer adduct in said cement being 2 to 50 weight %; (c) forming an emulsion from said cement in water by contacting the cement with 50 to 200 vol. % water based on the volume of the cement, the water containing an anionic or non-ionic emulsifier, the quantity of emulisifier being 3 to 20 parts per hundred parts of polymer; (d) neutralizing said emulsion with an inorganic or organic base to form a substantially homogeneous raw emulsion in ionomeric form; and (e) removing solvent and excess water to form a finished ionomeric latex, said latex consisting essentially of water and 5 to 70% by weight solids, said solids having a particle size of 0.1 to 3 microns.

2. The process of claim 1 wherein said dienophilic anhydride comprises maleic anhydride.

3. The process of claim 1 wherein said copolymer comprises conjugated diene butyl rubber.

4. The process of claim 1 wherein said hydrocarbon solvent is selected from the group consisting of hexane, heptane, benzene, and toluene.

5. The process of claim 1 wherein said latex has an average particle size of between about 0.1 and 2 microns.

6. The process of claim 1 wherein said emulsion is neutralized by the addition of an inorganic base.

7. The process of claim 6 wherein said inorganic base comprises an alkali metal hydroxide or ammonium hydroxide.

8. The process of claim 7 wherein said alkali metal hydroxide is sodium hydroxide or potassium hydroxide.

9. The process of claim 1 wherein said emulsion is neutralized by the addition of an organic base thereto.

10. The process of claim 9 wherein said organic base is selected from the group consisting of ethylamine and triethylamine.

11. The process of claim 3 wherein said dienophilic anhydride comprises maleic anhydride.

12. The process of claim 3 wherein said ionomeric latex has an average particle size of less than about 1 micron.

13. The process of claim 3 wherein said hydrocarbon solvent is selected from the group consisting of hexane, heptane, benzene, and toluene.

14. The process of claim 3 wherein said emulsion is neutralized by the addition of an inorganic base.

15. The process of claim 14 wherein said inorganic base comprises an alkali metal hydroxide or ammonium hydroxide.

16. The process of claim 15 wherein said alkali metal hydroxide is sodium hydroxide or potassium hydroxide.

17. The process of claim 3 wherein said emulsion is neutralized by the addition of an organic base.

18. The process of claim 17 wherein said organic base is selected from the group consisting of ethyl amine and triethylamine.

19. The process of claim 1 wherein the emulsifier is the sodium salt of a sulfate ester of nonylphenoxypoly (ethyleneoxy) ethanol comprising 4 moles of ethylene oxide or ethoxylated octyl phenol comprising about nine moles of ethylene oxide.

20. The process of claim 3 wherein the emulsifier is the sodium salt of a sulfate ester of nonylphenoxypoly (ethylenoxy) ethanol comprising 4 moles of ethylene oxide or ethoxylated octyl phenol comprising about 9 moles of ethylene oxide.

21. The process of claim 1 wherein said finished latex has a solids content of 40 to 70% by weight.

22. The product by the process of claim 1.

23. The product by the process of claim 3.

* * * * *